United States Patent [19]

Ueno et al.

[11] 4,298,706
[45] Nov. 3, 1981

[54] FOAMS PREPARED FROM POLYPROPYLENE RESIN COMPOSITION AND PROCESS FOR PRODUCING SAME

[75] Inventors: Takashi Ueno; Kyoichi Nakamura, both of Osaka, Japan

[73] Assignee: Kanegafuchi Kagaku Kogyo Kabushiki Kaisha, Osaka, Japan

[21] Appl. No.: 76,614

[22] Filed: Sep. 18, 1979
(Under 37 CFR 1.47)

[30] Foreign Application Priority Data

Sep. 18, 1978 [JP] Japan ................................. 53-114756

[51] Int. Cl.³ ............................................. B29D 27/00
[52] U.S. Cl. ................................... 521/92; 264/45.3; 264/53; 264/DIG. 5; 264/DIG. 16; 521/93; 521/97; 521/140; 521/908; 521/909
[58] Field of Search ................. 264/DIG. 16, 53, 45.5, 264/51, DIG. 5, 54, 45.3; 521/92, 93, 97, 140, 908, 909

[56] References Cited

U.S. PATENT DOCUMENTS

| | | | |
|---|---|---|---|
| 3,231,524 | 1/1966 | Simpson | 264/DIG. 16 |
| 3,498,963 | 3/1970 | Ichikawa et al. | 526/138 |
| 3,608,006 | 9/1971 | Hosoda et al. | 264/DIG. 16 |
| 3,696,059 | 10/1972 | Hosoda et al. | 521/909 X |
| 3,939,237 | 2/1976 | Naito et al. | 264/54 |
| 3,981,830 | 9/1976 | Takeuchi et al. | 521/92 |

FOREIGN PATENT DOCUMENTS

| | | |
|---|---|---|
| 354341 | 8/1957 | Japan . |
| 46-41474 | 12/1971 | Japan . |
| 47-49825 | 12/1972 | Japan . |
| 48-4945 | 2/1973 | Japan . |
| 1158296 | 7/1969 | United Kingdom . |
| 1182646 | 2/1970 | United Kingdom ....... 264/DIG. 16 |

*Primary Examiner*—Philip Anderson
*Attorney, Agent, or Firm*—Armstrong, Nikaido, Marmelstein & Kubovcik

[57] ABSTRACT

Foams of polypropylene resin composition having remarkably improved extrusion foaming characteristics are prepared by a non-crosslinking extrusion foaming process comprising mixing and kneading polypropylene resin and 1,2-polybutadiene resin so that 1,2-polybutadiene resin reacts under the influence of the heat and shearing stress in the extruder, and extruding thereafter.

19 Claims, 3 Drawing Figures

KNEADING TEMPERATURE, 190°C

KNEADING TEMPERATURE, 230°C

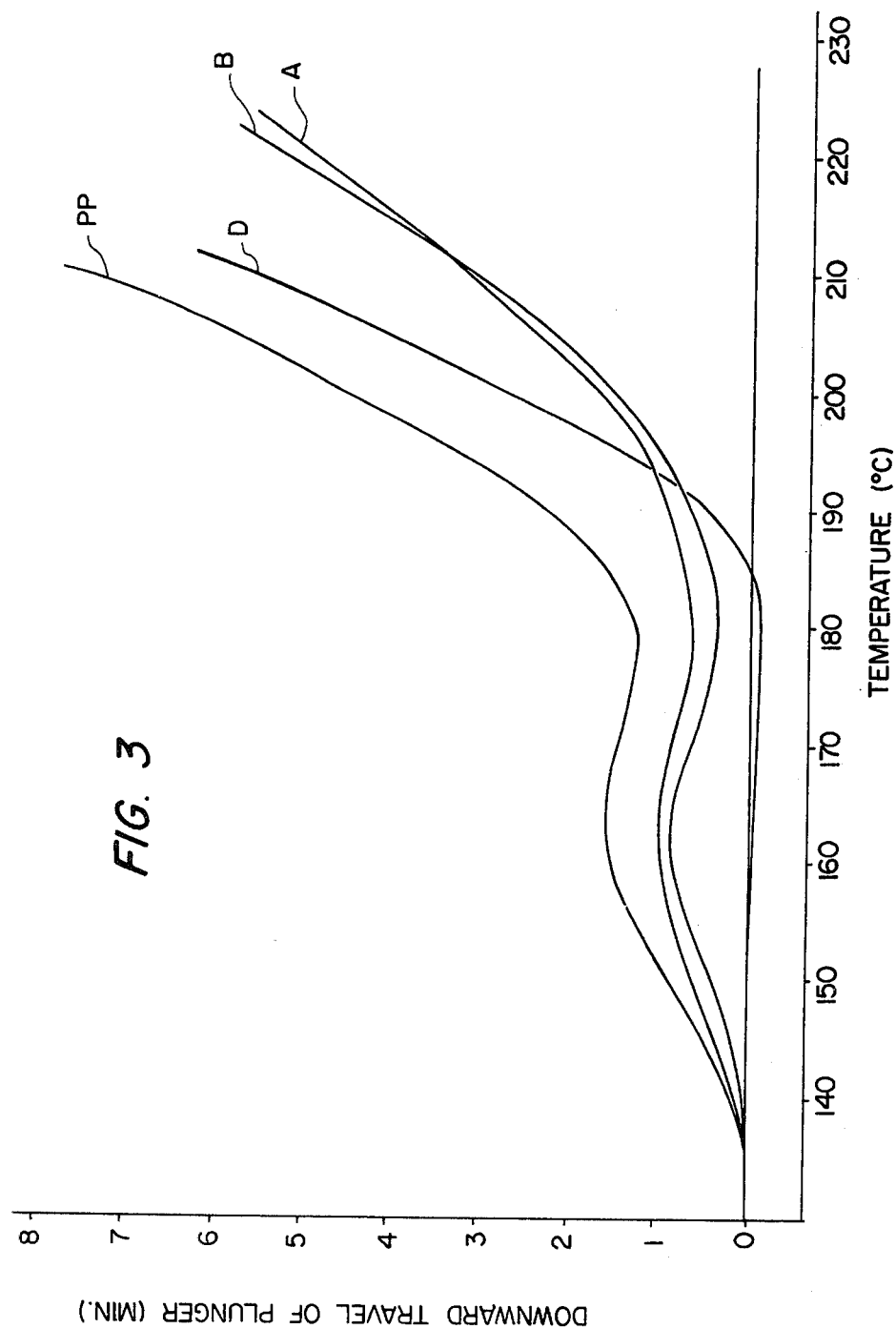

FOAMS PREPARED FROM POLYPROPYLENE RESIN COMPOSITION AND PROCESS FOR PRODUCING SAME

BACKGROUND OF THE INVENTION

1. Field of the Invention

The present invention relates to foams prepared from compositions comprising polypropylene (hereinafter referred to as "PP") resin and having remarkably improved extrusion foaming characteristics and to a process for producing the same, and more particularly to foams of PP resin composition prepared by kneading at a high temperature and high pressure a composition comprising PP resin, 1,2-polybutadiene (hereinafter referred to as "1,2-PB") resin and a blowing agent, thereafter cooling the composition and extruding the cooled composition into a low pressure zone, the extruded foams being characterized in that when dissolved in hot xylene, the foams have an insoluble content of at least 2% by weight based on the whole composition and a soluble 1,2-PB resin content of up to 30% by weight based on the whole composition. The invention further relates to a process for producing same foams.

2. Description of the Prior Art

Processes are known for producing extruded foams from polyolefins or like thermoplastic resins by melting and kneading a composition of such resin and a blowing agent at a high temperature and high pressure as by an extruder, cooling the composition to a temperature suitable for foaming and extruding the composition into a low pressure zone for foaming.

Japanese Patent Publication No. 4341/1960, for example, discloses a process for preparing extruded foams from a polyolefin resin with use of sym-dichlorotetrafluoroethane as a blowing agent. More particularly said patent publication teaches a process for producing a cellular PP foam by heating highly crystalline PP resin and sym-dichlorotetrafluoroethane in a pressure-resistant steel tube container at a temperature of 175° C. for 8 hours, and thereafter extruding the resulting mixture into the atmosphere in an exploding fashion with high pressure nitrogen gas introduced into the tube.

Japanese Patent Publication No. 41474/1971 discloses a process for producing foams composed of polyhedral closed cells not smaller than 500μ and having a density of up to 0.03 g/cm$^3$ from a composition comprising PP resin or like crystalline organic linear polymer and a large quantity of activating liquid by flash extrusion foaming.

While these conventional processes afford foams of PP resin, the extrusion foaming operation of the former process involves low formability, produces cells of uneven structure and gives surface irregularities and poor appearance to the resulting foam, thus yielding products of reduced commercial value. With the latter process, the foams obtained are limited to the shape of filaments or a thin sheet, and the use of a large amount of activating liquid as a blowing agent inevitably gives foams expanded to an exceedingly high degree of 60 to 100 times. Thus the process involves extreme difficulties in producing under controlled conditions foams expanded to a foaming degree of 10 to 50 times and having a high degree of usefulness.

Stated more specifically, the conventional techniques for extruding and foaming highly crystalline PP resin are greatly limited in the range of temperatures for maintaining the resin at a viscoelastic strength suitable for foaming, so that it is almost impossible to maintain the resin at a properly controlled foaming temperature. Great difficulties have therefore been experienced in stably producing foams under controlled conditions having a foaming degree of 10 to 50 times with a neat appearance and uniform cellular structure.

Accordingly, it has been proposed to blend some other polymer with PP resin or to use a special PP resin as an improvement in the non-cross-linking extrusion process. Japanese Patent Publication No. 49825/1972, for example, discloses a process for efficiently preparing a foam having uniform minute cells from a mixture of polyethylene, PP resin or like polyolefin and 0.3 to 40 parts by weight of poly-cis-butadiene rubber admixed therewith. Japanese Patent Publication No. 4945/1973 further states that a highly foamed product having uniform minute cells can be prepared from a mixture of a chemical blowing agent and a special PP component containing at least 15% of n-heptane-soluble PP (which appears to be predominantly atactic) and having an intrinsic viscosity ($\eta$) of 3.0 to 10.0 by foaming the mixture with an extruder operating under a back pressure of at least 200 kg/cm$^2$ in the extruder and a temperature up to 200° C. (resin temperature at the die outlet). With respect to these processes, however, Japanese Patent Publication No. 49825/1972, which includes an example wherein low-density polyethylene, amenable to a homogeneous high-degree foaming technique, is used, emphasizes the effect of foaming nuclei as achieved by the use of a very small amount of polybutadiene, and mentions the use of a small amount of water which leads to greatly stabilized foaming. Thus, the prior art, which contemplates formation of minute cells with stability, is entirely distinct from the present invention in object and concept. Additionally, poly-cis-butadiene having poor thermal stability, when admixed with PP resin, gives reduced thermal stability at a high temperature of 80° to 130° C., thus totally offsetting the important feature of the foamed PP resin—its high resistance to heat. The special PP resin ingredient used in the technique disclosed in Japanese Patent Publication No. 4945/1973 contains at least 15% of n-heptane soluble resin and is therefore invariably lower than usual PP resin in crystallinity and melting point. Consequently, the PP resin ingredient has considerably lower heat resistance and mechanical strength, affording foams having reduced heat resistance and mechanical strength.

In recent years there is a growing commercial demand for foams which have higher resistance to heat and lower water absorbing properties than known polyethylene or polystyrene foams and which also possess heat insulating and shock absorbing effects. Accordingly, various techniques have been developed in the art for producing highly foamed products by the non-cross-linking extrusion of high density polyethylene, polypropylene and like resins having higher crystallinity and greater heat resistance than other polyolefin resins. These techniques nevertheless still remain to be improved and have not found wide application.

In view of the present situation described above, we have: (a) conducted intensive research on techniques for producing foams having a high foaming degree of 10 to 50 times from PP resin which has especially high resistance to heat among highly crystalline polyolefins resins; and (b) developed foams, as well as a process for producing the same, which have outstanding heat resistance, a uniform cellular structure, attractive appearance and high foaming degree by overcoming the foregoing drawback of PP resin that it has a narrow range of proper extrusion foaming temperatures, without necessitating the complex steps needed for the conventional cross-linking process.

SUMMARY OF THE INVENTION

More specifically stated, the present invention provides foams prepared from a composition comprising highly crystalline PP resin and 1,2-PB resin admixed therewith and made commercially available as a novel thermoplastic resin since 1974, the foams being characterized in that they contain at least 2% by weight of hot xylene insoluble thermal reaction product based on the whole composition, and the admixed 1,2-PB resin affording a hot xylene soluble content of up to 30% by weight based on the whole composition. The invention also provides a novel process for producing the foams characterized in that the PP resin and the 1,2-PB resin are kneaded together under high pressure and at such an elevated temperature that the admixed 1,2-PB resin, when partly or wholly subjected to thermal reaction, gives a hot xylene insoluble content of at least 2% by weight based on the whole composition, the admixed 1,2-PB resin further affording a soluble content of up to 30% by weight based on the whole composition.

BRIEF DESCRIPTION OF THE DRAWINGS

This invention will be more clearly understood by reference to the accompanying drawings in which:

FIG. 3 shows the flow curves of pressed specimens of the foams prepared in Example 1 and Comparison Example 1.

DESCRIPTION OF PREFERRED EMBODIMENTS

Figure 1:
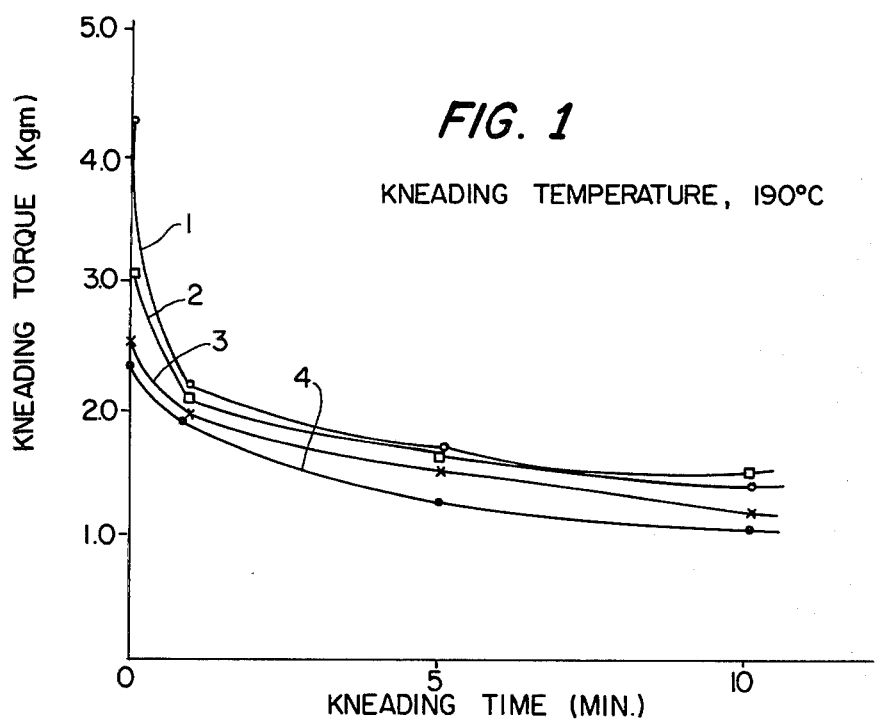
FIGS. 1 and 2 are graphs showing kneading torque-time curves obtained with use of a Brabender device.

At first, we attempted to foam PP resin singly by an extrusion process corresponding to the technique disclosed in Japanese Patent Publication No. 4341/1960. To be sure, the process gave a foamed product but involved a very narrow range of proper extrusion foaming temperatures, while the foam was found to be of no commercial value because it had an irregular surface and a markedly uneven cellular structure including unfoamed cores and voids extending into the interior of the foam. These difficulties encountered in the extrusion foaming of PP resin are very characteristic of this resin unlike other resins, such as polystyrene and low-density polyethylene, from which an appreciably uniform cellular structure can be obtained without resorting to a special extrusion process. The above difficulties appear attributable to the extremely limited range of temperatures at which PP resin retains viscoelastic strength suitable for foaming said resins by the non-cross-linking process. At temperatures not lower than the melting point, PP resin has a reduced melt viscosity, permitting the blowing gas pressure to break cell forming walls without foaming, whereas at temperatures lower than the melting point, crystallization starts to take place, causing the blowing agent to separate from the molten resin and producing a marked increase in viscoelastic strength to prevent foaming. Thus, the high crystallinity of PP resin causes a great change in its viscoelasticity in the vicinity of the melting point and leads to difficulties.

Accordingly, we conducted experiments with use of PP resin in admixture with various thermoplastic resins in order to overcome the foregoing difficulties inherent in the extrusion foaming of PP resin. Close investigations were made on more than ten kinds of thermoplastic resins including low density polyethylene, ethylene-vinyl acetate copolymer, ethylene-propylene copolymer, ethylene-propylene-diene terpolymer, crystalline isotactic polybutene-1, polyisobutylene, isoprene-isobutylene rubber, cis-1,4-polybutadiene rubber, low-molecular-weight polyethylene, poly-4-methylpentene-1, thermoplastic polyester elastomer, 1,2-PB resin, and the like. As a result, we have found that to foam PP resin without encountering difficulty because or the narrow range of proper foaming temperature, uneven cellular structure of the foam, surface irregularities in the foam product, and the like it is necessary to use the PP resin in admixture with 1,2-PB resin.

Thus the use of 1,2-PB resin as kneaded with PP resin under specified conditions renders PP resin extrudable over a wider range of proper foaming temperatures, produces a uniform cellular structure and results in diminished surface irregularities, giving remarkably improved extrudability to the PP resin and permitting efficient production of foams with a high degree of foaming. The reason why such effects are achievable according to this invention remains to be fully clarified. However, it is believed that, when PP resin and 1,2-PB resin are kneaded together as by an extruder at a high temperature and high pressure, chemically active side-chain vinyl groups of the 1,2-PB resin locally undergo, under the influence of the heat and shear force, a complex reaction including intermolecular cross-linking and/or intramolecular cyclization. Since the PP and 1,2-PB resins are being kneaded at this time, the reaction product becomes intimately entangled with molecular chains of the PP resin. Presumably this effect of entanglement reduces the marked change of viscoelasticity attendant on the foaming of PP resin. It appears that the reaction product of the 1,2-PB resin accounts for nearly the entire portion of the hot xylene insoluble content referred to in this invention. Nevertheless, we do not wish to be bound by this hypothesis.

As will be shown in Comparison Example 2, given later, the 1,2-PB resin, if unreacted, merely produces the same result as will be achieved by the addition of a polymer different from, and having a lower melt viscosity than, the PP resin, thus totally failing to attain the effect of mitigating the marked change of the viscoelasticity in the vicinity of the melting point of the PP resin. It is therefore impossible to give improved extrudability to the PP resin and to obtain highly foamed products with stability as contemplated, merely by subjecting a mixture of PP resin and 1,2-PB resin to extrusion foaming. To fulfill this object, it is critical that the mixture be melted and kneaded at an elevated temperature such that the 1,2-PB resin, when partly or wholly subjected to thermal reaction, gives a hot xylene insoluble content of at least 2% by weight based on the whole mixture, and the admixed 1,2-PB resin has a hot xylene soluble content of up to 30% by weight based on the whole mixture.

To substantiate this requirement by experiments, 10, 30 and 50 parts by weight of 1,2-PB resin ["PBRB 820," product of Japan Synthetic Rubber Co., Ltd., Japan, melt index (hereinafter abbreviated as "MI") 2.5

Figure 2:
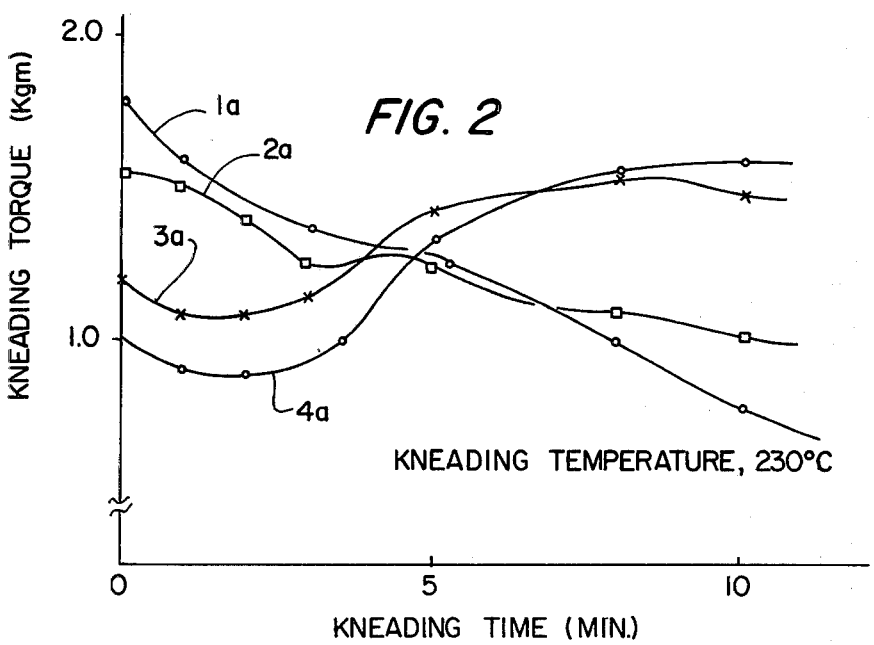

(ASTM D-1238, 150° C.)] were kneaded with 100 parts by weight of PP resin ["NOBLEN EB," product of Mitsui Toatsu Co., Ltd., Japan, MI 0.5 (ASTM D-1238, 230° C.)] by a Brabender plastograph ("PLASTI-CORDER PLV 151," product of Brabender Co., West Germany) at a jacket temperature of 190° C. and 230° C. respectively, and the mixtures were checked for kneading behavior for comparison. The Brabender plastograph is widely used in the plastics molding industry as a device for determining the kneading behavior of molten resins in terms of a kneading torque-time curve while subjecting the resin to a specified shear force and heat. FIGS. 1 and 2 are graphs showing kneading torque-time curves obtained with use of a Brabender device for illustrating the process of this invention in which 1,2-PB resin thermally reacts to produce a hot xylene insoluble reaction product, the curves of FIG. 1 being obtained at a kneading temperature of 190° C., and the curves of FIG. 2 at 230° C. In FIGS. 1 and 2, curves 1 and 1a represent single use of PP resin, curves 2 and 2a are for PP resin+10 parts of 1,2-PB resin, curves 3 and 3a are for PP resin+30 parts of 1,2-PB resin, and curves 4 and 4a are for PP resin+50 parts of 1,2-PB resin.

Comparison between FIGS. 1 and 2 reveal that the kneading torque at 190° C. progressively decreases regardless of the proportion of 1,2-PB resin, whereas the kneading torque at 230° C. increases with an increase in the proportion of 1,2-PB resin. It is especially noted that the mixtures in FIG. 2 containing 30 and 50 parts by weight of 1,2-PB resin (curves 3a and 4a, respectively) provide S-shaped curves as typical of the vulcanization or curing behavior of resin or rubber while curves 3 and 4 in FIG. 1 progressively decrease. These results indicate that the PP resin and 1,2-PB resin, when kneaded at 190° C., form a mere mixture, while at 230° C., the 1,2-PB resin undergoes the above-mentioned complex reaction, permitting the resulting reaction product to be intimately entangled with the PP resin and/or 1,2-PB resin to impart an increased melt viscosity to the system. The above experimental results achieved with a Brabender device are closely related with the essential requirement of this invention that the mixture of PP resin and 1,2-PB resin be kneaded in a molten state at an elevated temperature such that the resulting kneaded mixture contains at least 2% by weight of hot xylene insolubles which appear almost entirely attributable to the reaction of the 1,2-PB resin, the mixture further having a hot xylene soluble content of up to 30% by weight afforded by the admixed 1,2-PB resin.

It appears from the foregoing results that when a mixture of PP resin and 1,2-PB resin is kneaded under specified conditions, the 1,2-PB resin thereby subjected to heat and shearing stress locally undergoes a complex reaction including intermolecular cross-linking and/or intramolecular cyclization, permitting the reaction product to be intimately entangled with molecular chains of the PP resin and/or unreacted 1,2-PB resin to give an increased melt viscosity to the mixture and consequently reducing the great change of viscoelasticity that otherwise would take place when PP resin is subjected to non-cross-linking extrusion foaming.

Highly crystalline PP resins useful as the main starting material to be extruded for practicing this invention include usual commercial isotactic homopolypropylene resin, stereospecific propylene-ethylene random copolymer or stereospecific propylene-ethylene block copolymer incorporating a small amount of copolymerized ethylene, modified polypropylenes containing other monomers as copolymerized for various purposes, and the like. Especially suitable for use are those having a melt index (MI) of up to 2.0 (as measured according to ASTMD-1238). The 1,2-PB resin to be used as admixed with PP resin is a novel thermoplastic resin developed and made commercially available recently. This resin contains at least 70% of vinyl structure (1,2-bonds) and has an intrinsic viscosity ($\eta$) of at least 0.7 dl/g as measured in toluene at 30° C. and a melting point of not lower than 40° C. The 1,2-PB resin useful in this invention can be prepared, for example, by the process disclosed in Japanese Patent Publications No. 63159/1966, No. 63160/1966 and No. 45368/1967. (These three applications are combined with priority claim into U.S. Pat. No. 3,498,963).

The amount of 1,2-PB resin to be used in this invention, although not particularly limited, is preferably 5 to 50 parts by weight, more preferably 10 to 30 parts by weight, per 100 parts by weight of PP resin. Use of less than 5 parts by weight of 1,2-PB resin fails to give the desired improved properties to the PP resin, whereas with more than 50 parts by weight of the resin present, the usual economical extrusion kneading method will leave an increased amount of the 1,2-PB resin unreacted, failing to fully alter the viscoelasticity of the PP resin and frequently impairing the foaming properties thereof and also impairing the characteristics of the PP foamed products. For this reason, the 1,2-PB resin should preferably be used in a proportion in the above-mentioned range.

The foams obtained according to this invention contain hot xylene insolubles in an amount of at least 2% by weight based on the whole composition comprising the PP resin and 1,2-PB resin in mixture, the admixed 1,2-PB resin further having a hot xylene soluble content of up to 30% by weight based on the whole composition. The foams are so defined for the following reasons. The hot xylene insoluble content should not be less than 2% by weight based on the whole composition because smaller amounts do not mitigate marked changes in the viscoelasticity of the PP resin during extrusion foaming, failing to afford improved extrusion foaming properties as desired. Preferably the insoluble content is at least 4% by weight. Furthermore, the hot xylene insolubles are not defined as being limited only to the thermal reaction product of the 1,2-PB resin because the 1,2-PB resin undergoes a very complex reaction when subjected to heat and shear force as already mentioned, with the likelihood that part of the PP resin will also participate in the cross-linking reaction of the 1,2-PB resin. If it is positively attempted to promote a cross-linking reaction between the PP resin and 1,2-PB resin, suitable amounts of divinylbenzene, triallyl cyanurate, triallyl isocyanurate, quinonedioxime, quinonedioxime dibenzoate, trimethylolpropane triacrylate, triallyl trimellitate, maleic anhydride or like reactive compound and/or organic peroxide, azide compound, and the like can be introduced in the composition.

The hot xylene soluble content afforded by the 1,2-PB resin admixed with the PP resin is defined as being limited to not more than 30% by weight based on the whole composition, because with over 30% by weight of the soluble content present, the 1,2-PB resin is almost unable to cause marked changes of viscoelasticity of the PP resin during extrusion foaming, while the 1,2-PB resin, when not reacted, will produce the same result that is attained when a low-viscosity polymer component is incorporated into the PP resin matrix, possibly entailing a lower foamability than when the PP resin is extruded singly. The soluble content is preferably up to 20% by weight, more preferably up to 15% by weight. Thus, the degree of the reaction of the 1,2-PB resin: (a) should be defined as above in terms of hot xylene soluble 1,2-PB resin content as well as insoluble resin content because too great an excess of unreacted 1,2-PB resin in the whole composition impairs process and products of this invention despite the amount of the hot xylene insoluble content including reacted 1,2-PB resin; and (b) should not be defined on the basis of the amount of 1,2-PB resin added to the composition, but should be defined on the basis of the whole composition including PP resin plus the 1,2-PB resin added.

The term "hot xylene soluble content" refers substantially to unreacted 1,2-PB resin which is inherently fully soluble in xylene even at room temperature, but if it is attempted to dissolve and suspend the foam in xylene at room temperature, a low efficiency will result since the PP resin to be dissolved mainly constituting the foam and the thermally reacted 1,2-PB resin to be suspended is not suspended in xylene at approximately room temperature. Thus, hot xylene is used to suspend the insolubles and to dissolve the soluble component easily at the same time.

The term "hot xylene" as used in this invention refers to xylene heated at least to a temperature at which PP resin is completely soluble, namely to a temperature of about 130° C. to boiling point of about 140° C.

The composition of PP resin and 1,2-PB resin must be kneaded as by an extruder essentially at an elevated temperature such that the 1,2-PB resin, when partly or wholly subjected to thermal reaction, gives hot xylene insolubles in an amount of at least 2% by weight based on the whole composition, the admixed 1,2-PB resin giving a hot xylene soluble content of up to 30% by weight based on the whole composition. The kneading temperature is not always specifically determinable since the temperature appears to have close relations with many factors such as the kneading time, the shape of the kneading screw, pressure level, the kind of the blowing agent, the kinds of the PP resin and 1,2-PB resin, the amount of the 1,2-PB resin, and the like. Thus, the kneading temperature should be determined for each of the variations of this invention. However, the lower temperature limit will generally be around 200° C., while the upper temperature limit will be naturally determined in view of the temperature at which the PP resin and/or 1,2-PB resin will start thermal decomposition or degradation. Preferably, the kneading temperature for the variations of this invention will be in the range of 200° to 280° C. The inner pressure of the extruder at mixing and kneading PP-resin and 1,2-PB resin also varies depending upon various factors including extrusion output, shape of extruding die, melt viscosity of resin used, shape of screw, kinds of blowing agents and so forth, and will also be determined for each of the variations of this invention. The pressure at each variation may usually be more than 100 kg/cm$^2$ at the metering zone with the use of an ordinal extruder for foaming.

Examples of blowing agents useful for this invention are trichloromonofluoromethane, methylene chloride, methyl chloride, dichlorodifluoromethane, dichloromonofluoromethane, monochlorodifluoromethane, dichlorotetrafluoroethane, trichlorotrifluoroethane and like hydrocarbon halides, propane, butane, pentane, hexane and like aliphatic hydrocarbons, alcohols, esters, ketones, ethers, sodium bicarbonate, azodicarbonamide, N,N'-dinitrosopentamethylenetetramine, p-toluenesulfonylsemicarbazide and like chemical blowing agents. These blowing agents are used singly, or at least two of them are usable in admixture. It is preferable to use organic volatile blowing agents boiling at −40° C. to 60° C. at atmospheric pressure singly or as a mixture of two or more of such agents. These blowing agents are used in an amount suitably determined in accordance with the foaming degree of the desired product.

The present invention will be practiced in the following manner. The PP resin and 1,2-PB resin are mixed together by any of usual methods. Thus the PP resin and 1,2-PB resin may be mixed together in the desired ratio into a masterbatch at pellets which are fed to an extruder. Alternatively, the PP resin and 1,2-PB resin are mixed together in a higher 1,2-PB ratio than the desired ratio into a masterbatch, which is then diluted with a dry blend of the PP resin to the desired ratio and fed to the extruder. Further alternatively, pellets of the resins are dry-blended in the desired ratio as by a ribbon blender and then fed directly to the hopper of the extruder. The composition obtained therewith is mixed and kneaded in the extruder at elevated temperature which is predetermined within the range of 200° to 300° C. so as to give more than 2% of hot xylene insoluble content and less than 30% of hot xylene soluble content (the most critical feature of the present invention), based on mixing ratio of 1,2-PB resin, kind of PP-resin, kind of 1,2-PB resin, kind and amount of blowing agent, shape of extruder, extrusion output, and so forth which are determined subject to properties required for foamed products.

Suitable for use as the extruder is a device adapted to heat the composition at a temperature suited to the thermal reaction of the 1,2-PB resin. Generally it is convenient to use a plastics extruder which may be of any usual type adapted for the production of foams, and an extruder of the autoclave or pressure container type may also be used. The resin may be mixed, kneaded and cooled by a single extruder [or by a plurality of extruders] or by a plurality of extruders connected together.

As in the usual extrusion foaming process, the present composition may further incorporate cell nucleus forming agent comprising inorganic chemicals ground into fine powder including talc, zinc white, calcium carbonate, sodium bicarbonate, or the like, citric acid, metal salts of stearic acid, or the like. These cell nucleus forming agent may be used solely or in the mixture thereof. Pigments, flame retardants, stabilizers such as an antiaging agents against heat or light, plasticizers, and the like may also be used as desired in accordance with the contemplated end use of the foam. Furthermore, the composition may incorporate thermoplastic resins such as aromatic vinyl polymers such as polystyrene, ethylene-α-olefin copolymer and the like in amounts that will not greatly impair the properties of the extruded faomed product and extrudability. When the composition contains talc or like inorganic nucleus forming agent or other hot xylene insoluble thermoplastic resins (i.e., hot xylene insoluble thermoplastic resins not derived from the 1,2-PB resin) or the like admixed therewith, the hot xylene insoluble content must be determined exclusive of the amount of such components.

The blowing agents are used in this invention in the following manner. Chemical blowing agents are mixed into the masterbatch as by an extruder at a temperature at which the resins will melt but the blowing agent will not decompose, or may be mixed directly with the composition by the dry blending method. Volatile blowing agents can be forced into the composition through an inlet formed in the barrel of the extruder and/or admixed therewith in the form of pellets impregnated with the volatile blowing agent.

The molten kneaded mixture of the resin composition and blowing agent of this invention is cooled to a temperature suitable for foaming. The resin extruding temperature can be measured with a resin thermometer extending into the resin flow channel from the wall of an adapter (die head) attached to the forward end of the extruder. The measured value is used as a factor for controlling the foaming of the composition.

The resin extruding temperature varies greatly with the kinds of the starting resin, the kind and amount of the blowing agent, and the like and is determined for each of the variations of this invention and usually is within the range of about 140° to about 200° C.

The molten kneaded mixture of the resin composition and blowing agent is extruded thereafter to a low pressure zone through a die attached to the adapter. The said low pressure zone in the present invention means a zone under vacuum pressure or atmospheric pressure, atmospheric pressure is usually preferred.

Hot xylene insolubles and hot xylene solubles which are critical in this invention can be identified by the following method. First, the foam obtained is dissolved in hot xylene at 130° C. to the boiling point of around 140° C. at atmospheric pressure to a concentration of 1 to 2% by weight. If the 1,2-PB resin has reacted thermally, the solution will readily be seen found to be turbid when observed with the unaided eye, thus indicating the presence of insolubles. Although the turbidity can be measured for example in terms of light ray transmittance, a more accurate method is to centrifuge the solution while hot, using the utmost care to avoid a drop of temperature (which would allow the dissolved PP resin component to separate out as crystals), whereby a substance causing the turbidity which is thought to be the thermal reaction product of the 1,2-PB resin can be collected. The substance separated by centrifuging is thoroughly dried and analyzed (e.g., by infrared absorption spectroscopy) to confirm its identity. The hot xylene soluble component of the 1,2-PB resin is also extracted in this procedure. Namely, the solution after separating the thermal reaction product is cooled to separate out PP resin as crystals to determine the hot xylene soluble 1,2-PB resin.

In the case that the composition contains talc or like inorganic nucleus forming agent or other hot xylene insoluble thermoplastic resins, such components are tested beforehand to determine whether soluble or insoluble in hot xylene and then net amount of hot xylene insoluble thermal reaction product (Z, weight percent against the whole composition) is determined by the following calculation $$Z = Y - X$$

Wherein X is weight percent of other hot xylene insoluble content in the whole composition such as talc or like inorganic nulceus forming agent or other thermoplastic resins which are predetermined to be insoluble in hot xylene, Y is total amount in weight percent of hot xylene insoluble content in the whole composition of the foam, Z is net amount of hot xylene insoluble thermal reaction product, in weight percent against the whole composition.

It is noted that if a considerable amount of the blowing agents used remain in the interior of cells or in the cell walls at the time of determination of hot xylene insolubles (though it may rarely happen), such blowing agents can be removed by heating the sample of foam to a temperature beyond melting points of the resin used.

In the following Examples of this specification, solid cylindrical rods and thick plates were prepared as examples of foamed extrudates. Needless to say, the method of the present invention can also be applied for producing foams in the forms of pipe, sheet and the like. Thus the advantages of this invention are not limited to products of particular configuration.

The features and advantages of the present invention will be described below with reference to examples and comparison examples, in which the parts and percentages are all by weight. The term "foaming degree" as used in this invention is a numerical value (the number of times) expressed by the ratio of the resin density before foaming to the density of the foam obtained. The present invention will become more apparent from the following examples, which however are given for illustrative purposes only and are in no way limitative.

EXAMPLE 1

With 100 parts of PP resin ("NOBLEN EB," product of Mitsui Toatsu Co., Ltd., MI 0.5) were fully mixed 20 parts of 1,2-PB ("JSR-PBRB 820," product of Japan Synthetic Rubber Co., Ltd., MI 2.5), 0.1 part of sodium bicarbonate and 0.1 part of citric acid by a ribbon blender, and the mixture was fed at a rate of about 50 kg/hour to a foaming extruder having a cylinder 65 mm in inside diameter, maintained at a temperature of 250° to 280° C. at the kneading zone. Trichloromonofluoromethane and dichlorotetrafluoroethane compressed under pressure of 100 to 200 kg/cm$^2$ were forced into the extruder, each in a proportion of about 13 parts per 100 parts of the mixture, through a blowing agent inlet provided at an intermediate portion of the extruder. The resins and the blowing agents were cooled with full kneading so as to be extruded at a temperature of 158° to 162° C., and the composition was extruded into the atmosphere through a cylindrical die 10 mm in inside diameter and attached to an adapter at the forward end of the extruder to obtain a highly foamed product in the shape of a round bar. This foam product will be referred to as "Specimen A".

The same extrusion procedure as above was repeated except that the 1,2-PB resin was used in the varying proportions of 10, 30 and 50 parts to prepare highly foamed extruded products each in the form of a round bar. These foam products will be referred to as "Specimens B, C and D" respectively. Table 1 shows the quality evaluation, hot xylene insoluble content, hot xylene soluble 1,2-PB resin content, etc. of each of Samples A, B, C and D. Table 1 reveals that the use of 1,2-PB resin in admixture with PP resin afforded foams with remarkably improved extrusion foaming characteristics and high foaming degrees. The specimen (Specimen D) containing 50 parts of 1,2-PB resin, however, was found slightly inferior to Specimens A, B and C in every respect because of a higher hot xylene soluble 1,2-PB resin content as shown in Table 1.

Non-foamed sheets were prepared from Specimens A, B and D by a heat press and finely divided into pieces, which were tested for flow characteristics by a KOKA Flow Tester (A-method with a nozzle 1 mm in diameter and 10 mm in length, under load of 30 kg/cm$^2$, by raising temperature at the rate of 3° C./min from 130° C.). FIG. 3 shows the results, revealing that despite the use of 1,2-PB resin much lower than PP resin in melt viscosity, each system exhibits flow behavior indicating a melt viscosity higher than is afforded by the single use of PP resin. Curves A, B, D and PP in FIG. 3 represent Specimens A, B and D of Example 1, and the specimen of PP resin alone of Comparison Example 1, respectively. FIG. 3 appears to show that the apparent viscoelastic properties of the PP resin have been improved. However, Specimen D incorporating 50 parts of 1,2-PB resin has a greater hot xylene soluble 1,2-PB resin content relative to the whole composition and accordingly Specimen D shows higher fluidity than those incorporating 10 and 20 parts of 1,2-PB resin, thus exhibiting flow behavior considerably similar to that of the specimen consisting singly of PP resin, in corresponding relation to the above-mentioned slightly inferior foaming properties thereof.

TABLE 1

| Specimen | Amount of 1,2-PB resin (wt. parts per 100 wt. parts of PP resin) | Extruding temp. (°C.) | Foaming degree (times) | Surface appearance and cellular structure | Hot xylene insoluble content* (wt. %) | Hot xylene soluble content** (wt. %) |
|---|---|---|---|---|---|---|
| A | 20 | 160 | 35 | Smooth surface, uniform cells | 6.7 | 10.2 |
| B | 10 | 158 | 35 | Smooth surface, uniform cells | 5.0 | 4.2 |
| C | 30 | 159 | 35 | Smooth surface, uniform cells | 9.2 | 14.0 |
| D | 50 | 158 | 33 | Smooth surface, slightly nonuniform cells | 5.5 | 27.8 |

*Hot xylene insoluble content based on the whole composition.
**Hot xylene soluble 1,2-PB resin content based on the whole composition.

COMPARISON EXAMPLE 1

A round bar-like foam was prepared at an extruding temperature of about 157° to about 160° C. by repeating the extrusion foaming procedure of Example 1 under the same condition except that the same PP resin as used in Example 1 was used singly (i.e., without added 1,2-PB resin) as a starting material. Although the foam had an appreciably high foaming degree of about 35 times, unstable extrusion performance resulted with noticeable surface irregularities. The product had in its interior unfoamed cores and communicating voids of varying sizes, hence of low commercial value.

COMPARISON EXAMPLE 2

The extrusion foaming procedure of Example 1 was repeated under the same conditions with use of the same resin composition as used for Specimen A of Example 1 except that the cylinder of the kneading zone of the extruder was maintained at a temperature of 190° to 200° C. Consequently it was almost impossible to extrude the composition at a proper foaming temperature. The product had a low foaming degree of about 12 times, a very uneven cellular structure and a poor surface appearance and was commercially of no value. Not hot xylene insolubes were detected from this specimen, presumably because the temperature of the extruder cylinder providing a melt kneading zone was too low in this comparison example to cause any thermal reaction of the 1,2-PB resin. Consequently, the 1,2-PB resin failed to give improved viscoelasticity to the PP resin during extrusion foaming, merely producing the same result as achieved by a mixture of PP resin and a lower viscous resin. Thus, the foaming performance was even inferior to that achieved by the single use of PP resin.

EXAMPLE 2

With 100 parts of PP resin ("NEBLEN EP," product of Mitsui Toatsu Co., Ltd., MI 0.3) were admixed 20 parts of the same 1,2-PB resin as used in Example 1, and 0.4 part of sodium bicarbonate and 0.4 part of citric acid serving as cell nucleus forming agents to prepare a starting composition. Trichloromonofluoromethane and dichlorotetrafluoroethane serving as blowing agents were forced into the composition, in proportions of 21 and 8 parts respectively per 100 parts of the resin mixture. A forming device and a rectangular slit die serving as a foaming die were used. With the exception of these conditions, the composition was extruded for foaming under the same conditions as in Example 1, giving a highly foamed product in the form of a thick rectangular plate about 40 mm in thickness and about 140 mm in width. The composition was extruded at a temperature of about 162° to about 163° C. The product had a high foaming degree of about 40 times and was a thick homogeneous foam with an attractive surface appearance and a uniform cellular structure. The foam had a hot xylene insoluble content of about 10% based on the whole composition and a hot xylene soluble 1,2-PB resin content of about 7% based on the whole composition.

EXAMPLE 3

The extrusion foaming procedure of Example 2 was repeated under the same conditions except that the starting composition was a mixture of 100 parts of PP resin ("NOBLEN EP," product of Mitsui Toatsu Co., Ltd., MI 0.3), 20 parts of 1,2-PB resin ("JSR-PBRB 820," product of Japan Synthetic Rubber Co., Ltd., MI 2.5), 10 parts of PS resin ["ESBRITE #9." product of Showa Yuka Co., Ltd., MI 2.5 (JIS K-6870, 200° C.)], and 0.4 part of sodium bicarbonate and 0.4 part of citric acid serving as cell nucleus forming agents, whereby a highly foamed body was prepared in the form of a thick rectangular plate about 42 mm in thickness and about 143 mm in width. The composition was extruded at a temperature of about 162° to about 163° C. The product had a high foaming degree of about 42 times and was a thick homogeneous foam with an attractive surface appearance, a uniform minutely cellular structure and a high commercial value. The foam had a hot xylene insoluble content of about 8% based on the whole composition and a hot xylene soluble 1,2-PB resin content of about 8% based on the whole composition.

What we claim is:

1. A foam of polypropylene resin composition prepared from a composition comprising a mixture of (1) polypropylene resin and (2) 5-50 parts by weight per 100 parts by weight of the polypropylene resin of 1,2-polybutadiene resin which contains at least 70% of vinyl structure (1,2-bonds) and has an intrinsic viscosity ($\eta$) of at least 0.7 dl/g measured in toluene at 30° C. and a melting point of not lower than 40° C.; the foam being characterized in that it contains hot xylene insoluble thermal reaction products of 1,2-polybutadiene of at least 2% by weight based on the whole composition, and a hot xylene soluble content of 1,2-polybutadiene of up to 30% by weight based on the whole composition.

2. A foam as defined in claim 1 wherein the 1,2-polybutadiene is used in an amount of 10-30 parts by weight of the polypropylene resin.

3. A foam as defined in claim 1 wherein the polypropylene resin is isotactic homo-polypropylene resin.

4. A foam as defined in claim 1 wherein the polypropylene resin is stereospecific propylene-ethylene random copolymer.

5. A foam as defined in claim 1 wherein the polypropylene resin is stereospecific propylene-etylene block copolymer.

6. A foam as defined in claim 1 wherein the MI (as measured according to ASTM D-1238) of the propylene resin is up to 2.0.

7. A foam as defined in claim 1 which is in the form of a thick rectangular plate.

8. A foam as defined in claim 1 which is in the shape of a round bar.

9. A foam as defined in claim 1 which is prepared by an extrusion foaming process.

10. A foam as defined in claim 1 wherein a foaming degree is 10-50 times.

11. A process for preparing a foam from a polypropylene resin composition by melting and kneading a composition comprising polypropylene resin and a blowing agent at a high temperature suitable for foaming and thereafter extruding the cooled composition into a low pressure zone to obtain a foam of polypropylene resin, the process being characterized in that the composition incorporates 1,2-polybutadiene resin containing at least 70% of vinyl structure and having an intrinsic viscosity ($\eta$) of at least dl/g as measured in toluene at 30° C. and a melting point of at least 40° C., and that the composition is melted and kneaded at an elevated temperature at which the 1,2-polybutadiene resin, when partly or wholly subjected to thermal reaction, gives hot xylene insolubles in an amount of at least 2% by weight based on the whole composition, and the incorporated 1,2-polybutadiene resin has a hot xylene soluble content of up to 30% by weight based on the whole composition.

12. A process as defined in claim 11 wherein organic volatile blowing agents boiling at −40° C. to 60° C. at atmospheric pressure are used singly, or at least two of them are used in admixture.

13. A process as defined in claim 11 wherein the low pressure zone is at atmospheric pressure.

14. A process as defined in claim 11 wherein a cell nucleus forming agent is employed.

15. A process as defined in claim 14 wherein the cell nucleus forming agent is a member selected from the group consisting of talc, zinc white, calcium carbonate, sodium dicarbonate, citric acid, and metal salts of stearic acid.

16. A process as defined in claim 11 wherein the kneading temperature is in the range of 200° to 280° C.

17. A process as defined in claim 11 wherein at least one other thermoplastic resin is added to the composition comprising polypropylene resin and 1,2-polybutadiene resin.

18. A process as defined in claim 17 wherein the other thermoplastic resin is aromatic vinyl polymer.

19. A process as defined in claim 17 wherein the other thermoplastic resin is ethylene-$\alpha$-olefin copolymer.

* * * * *